July 10, 1934.  M. L. EDWARDS  1,965,695
BRAKING DEVICE FOR AUTOMOBILES
Filed Sept. 21, 1932  3 Sheets-Sheet 1
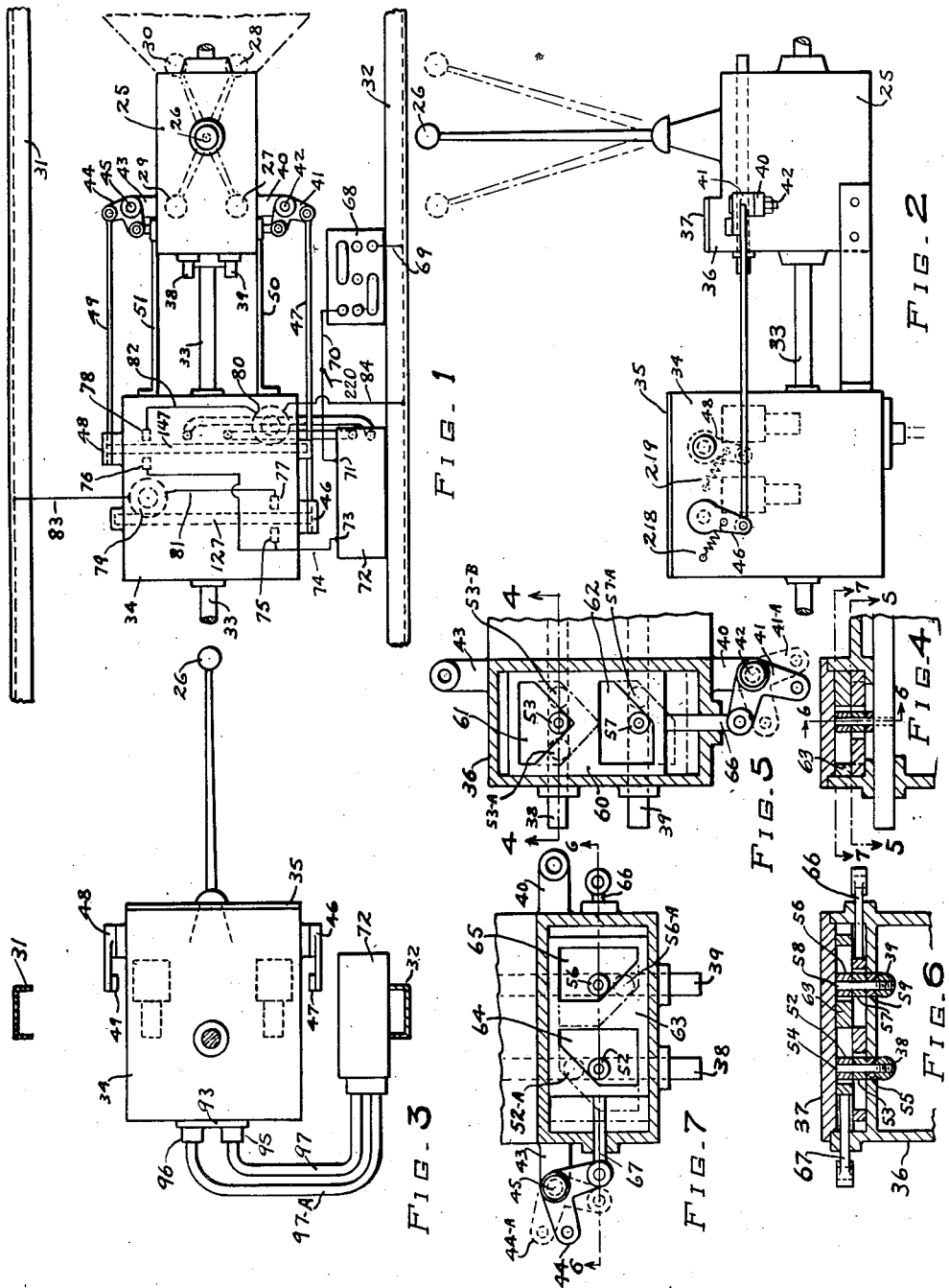
INVENTOR
M. L. EDWARDS
BY
ATTORNEY

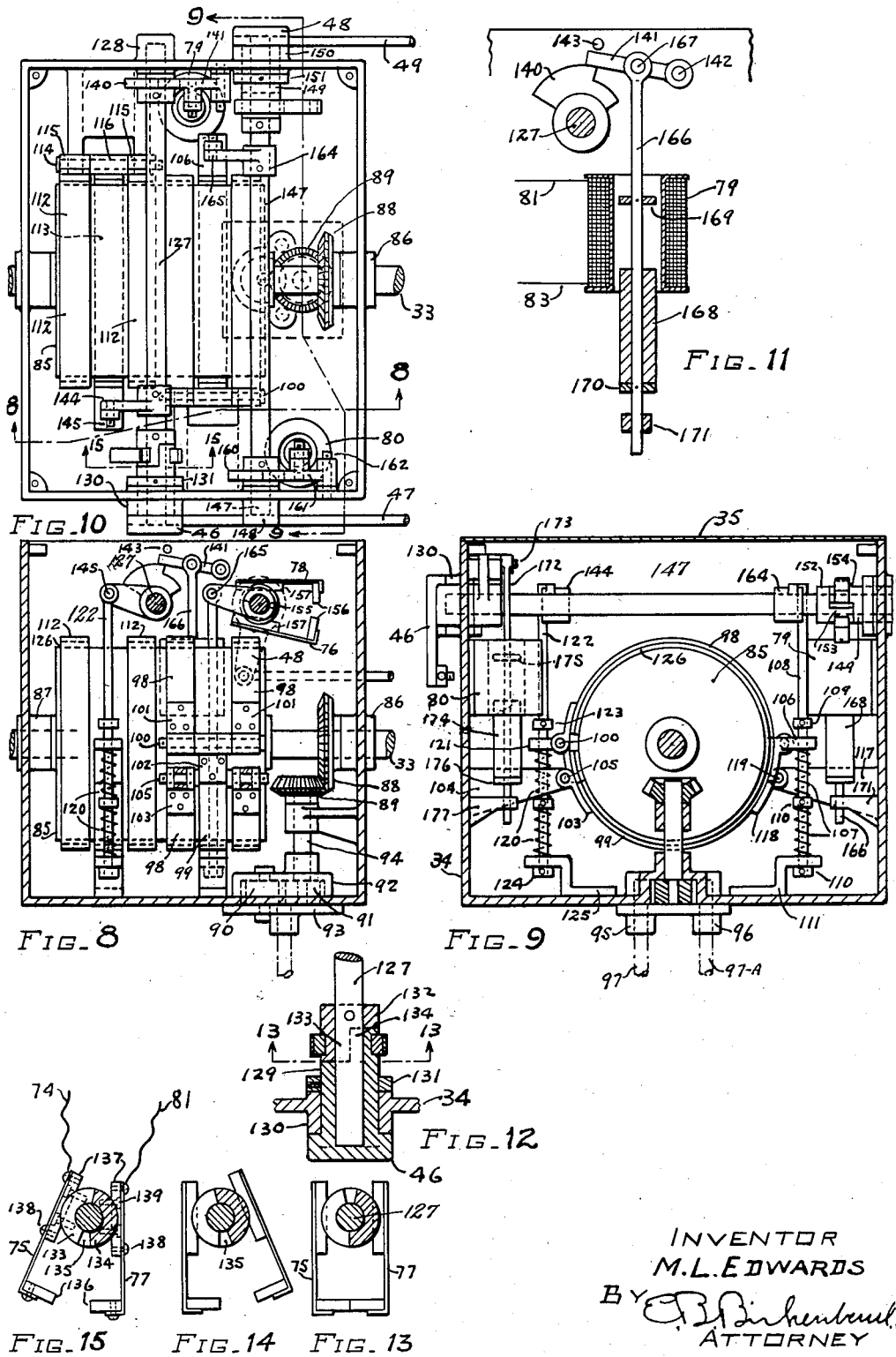

July 10, 1934. M. L. EDWARDS 1,965,695
BRAKING DEVICE FOR AUTOMOBILES
Filed Sept. 21, 1932   3 Sheets-Sheet 3
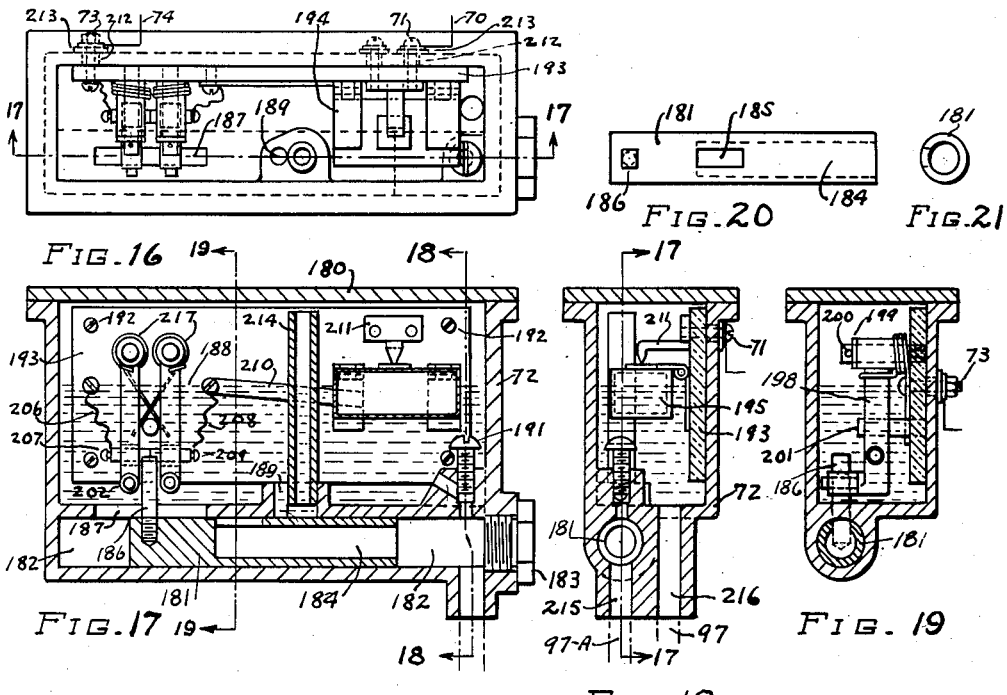
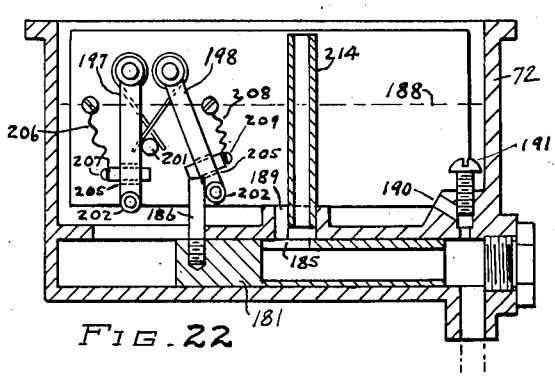
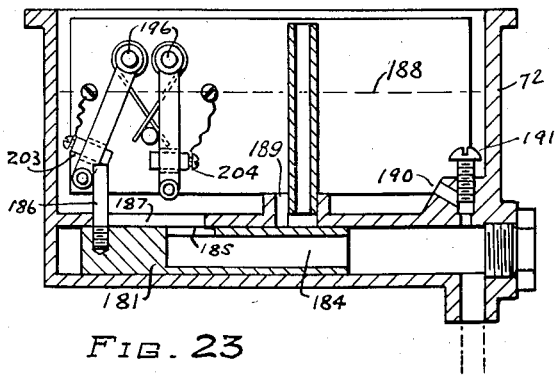
INVENTOR
M.L. EDWARDS
BY
ATTORNEY Patented July 10, 1934

1,965,695

UNITED STATES PATENT OFFICE 1,965,695

BRAKING DEVICE FOR AUTOMOBILES

Miles L. Edwards, Portland, Oreg.

Application September 21, 1932, Serial No. 634,128

5 Claims. (Cl. 192—4)

This invention relates generally to land traveling vehicles, and particularly to automobiles, trucks, tractors and the like.

The main object of this invention is to provide an automatic braking device which will prevent the vehicle from moving in a direction which is in opposition to the wishes of the driver thereof.

The second object is to provide a braking device which will facilitate the operation of motor driven vehicles, rendering same more safely and conveniently usable by the inexperienced and the experienced drivers alike.

These, and other objects, will become more apparent from the specification following as illustrated in the accompanying drawings, in which:

Fig. 1 is a somewhat diagrammatic plan of the device.

Fig. 2 is a side elevation of Fig. 1.

Fig. 3 is an end elevation of Fig. 1.

Fig. 4 is a vertical section along the line 4—4 in Fig. 5.

Fig. 5 is a horizontal section along the line 5—5 in Fig. 4.

Fig. 6 is a vertical section along the line 6—6 in Fig. 4.

Fig. 7 is a horizontal section along the line 7—7 in Fig. 4.

Fig. 8 is a vertical section through the casing enclosing the brake mechanism showing the brake mechanism in elevation along the line 8—8 in Fig. 10.

Fig. 9 is a vertical section along the line 9—9 in Fig. 10.

Fig. 10 is a plan of the brake mechanism showing the cover removed.

Fig. 11 is an enlarged view of the solenoid and associated parts.

Fig. 12 is a longitudinal section through the end of one of the contact arm shafts.

Fig. 13 is a section along the line 13—13 in Fig. 12 showing the first or contact position of the arms.

Fig. 14 is a view similar to Fig. 13 showing the second position.

Fig. 15 is a view similar to Fig. 14 showing the third position.

Fig. 16 is a plan of the zero speed mechanism.

Fig. 17 is a vertical section along the line 17—17 in Fig. 16 and Fig. 18.

Fig. 18 is a vertical section along the line 18—18 in Fig. 17.

Fig. 19 is a vertical section along the line 19—19 in Fig. 17.

Fig. 20 is a detailed view of the piston.

Fig. 21 is an end elevation of Fig. 20.

Fig. 22 is a view similar to Fig. 17 but showing the parts in a forward traveling position.

Fig. 23 is a view similar to Fig. 22 but showing the parts in a reverse traveling position.

Similar numbers of reference refer to similar parts throughout the several views.

Referring in detail to the drawings, there is shown a form of transmission commonly employed in motor propelled vehicles in which a gear box 25 contains the regular transmission gearing, and upon this gear box, mounted in the usual manner, is the gear shift lever 26 which is shown in full lines in the neutral position and in dotted lines in the engaged positions. While there is one gear shift lever, for the sake of convenience the high gear position will be referred to as 27, the intermediate position as 28, the low position as 29 and the reverse position as 30. The left hand side frame 31 and the right hand side frame 32 of the chassis are also shown in their relative positions. The propeller shaft 33 extends backwardly through the brake box 34 which is provided with a cover 35.

The usual gear box 25 is provided with the rearward extension 36 which houses the mechanism disclosed in detail in Figures 4 to 7 inclusive. To this is affixed the cover 37. In practice, the brake box 34 could be made an integral part of the gear box 25.

The end of the high and intermediate shifter shaft 38 is shown in the neutral position, as is also the low and reverse shifter shaft 39.

Attached to the right hand side of the gear box 25 is a bracket 40 which supports the bell crank 41 by means of the fulcrum bolt 42. Similarly on the left hand side of the gear box 25 is a bracket 43 which supports the bell crank 44 by means of the fulcrum bolt 45. The bell crank 41 is connected to the lever 46 by means of a connecting rod 47. Similarly the bell crank 44 is connected to the lever 48 by means of the connecting rod 49. Brackets 50 and 51 are shown as means for preventing rotation of the brake box 34 around the propeller shaft 33.

Upon the high and intermediate shifter shaft 38 are mounted two rollers 52 and 53 on the threaded pin 54. The roller 53 bears against a spacing collar 55 which bears against the shaft 38. Similarly upon the low and reverse shifter shaft 39 are mounted two rollers 56 and 57 on the pin 58 and the spacing collar 59.

Slidably mounted within the gear box 25 are the horizontal plates 60 and 63 which are movable in a direction normal to the shafts 38 and 39. The lower plate 60 is provided with openings 61 and 62 for the rollers 53 and 57 respectively, and the upper plate 63 is provided with openings 64 and 65 for the rollers 52 and 56 respectively. The particular shape of the openings 61 and 62, 64 and 65 will be explained in detail later.

The bell crank 41 is operated by the connecting rod 66 which is rigidly attached to the plate 60. The bell crank 44 is operated by the connecting rod 67 which is rigidly attached to the plate 63.

The storage battery 68 is shown grounded to the chassis frame 32 by the wire 69. Electrical current may pass from the battery 68 through the wire 70 to the terminal 71 of what will be referred to as the zero speed relay device 72, shown in detail in Figs. 16 to 23 inclusive.

From the terminal 73 of the zero speed relay 72 the wire 74 is connected with the forward speed contact arm 75 and the fixed reverse speed contact arm 76. The movable forward contact arm 77 is connected to the forward solenoid coil 79 through the wire 81, and the movable reverse contact arm 78 is connected to the reverse solenoid coil 80 through the wire 82. The forward speed coil 79 is grounded to the chassis frame 31 through the wire 83, and similarly the reverse coil 80 is grounded to the chassis frame 32 through the wire 84.

Upon the propeller shaft 33 is mounted a brake drum 85 which is held in alignment with the brake box 34 by the bearings 86 and 87. Also mounted on the propeller shaft 33 is a bevel gear 88 meshing with the pinion 89. The parts 90 and 91 are the rotors of the gear pump enclosed in the housing 92 by the cover plate 93. The pump is driven by the pinion 89 through the vertical shaft 94.

On the cover plate are the bosses 95 and 96 which contain openings for the suction and discharge pipes 97 and 97—A of the gear pump.

Around the brake drum 85 are mounted two sets of brakes, one set is to arrest the motion of the propeller shaft 33 when the vehicle is moving in the forward direction, and the other set is to arrest the motion of the shaft 33 when the vehicle is moving in a rearward direction. The reverse brake band consists of three parts, two circumferential bands 98 and one semi-circumferential band 99. The circumferential bands 98 are joined to the band 99 by a pin 100 through the eye pads 101 and 102. The bands 98 each have forked eye pads 103 riveted to their fixed ends, and these in turn are attached to the brake box 34 by the bracket 104 through the pins 105.

The movable end of the brake band 99 has a bracket 106 riveted thereto. The brake band 99 is held against the brake drum 85 by the springs 107 surrounding the vertical rod 108. Upon this rod there are pinned the limit collars 109 and 110. A guide 111 holds the lower end of the rod 108.

The forward brake band 112 consists of similar parts, except that they are arranged so as to hold against the rotation of the brake drum 85 in the opposite direction. The two circumferential brake bands 112 are connected to the band 113 by the pin 114 through the eye pads 115 and 116. The fixed ends of the forward brake bands 112 are attached to the brake box 34 by the bracket 117 through the forked eye pads 118 and the pins 119. The movable end of the brake band 113 is operated by the springs 120 thrusting against the bracket 121, which is riveted to the end of the band 113.

The vertical rod 122 passes through the bracket 121 as well as the springs 120. Upon the vertical rod 122 are pinned the limit collars 123 and 124. A guide 125 supports the lower end of the rod 122.

All of the brake bands have frictional lining 126 riveted thereto.

One end of the forward brake operating shaft 127 is supported in the brake box 34 by the bearing 128, and the other end is carried by the projecting sleeve 129 of the lever 46. The sleeve 129 is rotatably mounted in the brake box 34 by the bearing 130 and is held longitudinally in place by the set collar 131. Upon the shaft 127 is affixed the collar 132 which has a projecting jaw 133. The sleeve 129 which is free to rotate around the shaft 127 also has a projecting jaw 134 which is in mesh with the jaw 133 and is limited in its rotative movement by the small angle 135 between the jaws.

The jaw 133 carries the electrical contact arm 75, while the jaw 134 carries the contact arm 77. These contact arms have attached to their lower ends the breaker points 136 and are insulated from their respective jaws by the insulating strips 137. The arms are fastened to the insulating strips 137 by the screws 138, and the insulating strips 137 are attached to the jaws by the screws 139.

Also fixed upon the shaft 127 is the stepped quadrant 140 which, when the shaft is rotated through the angle 135, engages the pawl 141 which is pivotally mounted on the gear box wall by means of a pin 142, and is limited in its upward movement by the stop 143. Also fixed on the shaft 127 is a lever arm 144 which is connected to the vertical rod 122 by the pin 145.

It is similarly shown that one end of the reverse brake operating shaft 147 is supported in the brake box 34 by means of a bearing 148, and the other end is carried by the projecting sleeve 149 of the lever 48. The sleeve 149 is rotatably mounted in the brake box 34 by the bearing 150 and is held against longitudinal movement by the set collar 151. On the shaft 147 is fixed the collar 152 which has a projecting jaw 153. The sleeve 149 which is free to rotate about the shaft 147 also has a projecting jaw 154 which is in mesh with the jaw 153 and is limited in its rotative movement by the small angle 155.

The contactor arms 76 and 78 for the reverse brake shaft are exactly the same as the arms 75 and 77 for the forward brake shaft, and are mounted in a like manner so they will not be separately described.

There is fixed to the shaft 147 a stepped quadrant 160 which, when the shaft 147 is rotated through the angle 155, engages the pawl 161. The pawl 161 is attached to the brake box wall by the pin 162 and is limited in its upward movement by a stop (not shown) but similar to the stop 143.

Also fixed on the shaft 147 is a lever arm 164 which is connected to the vertical rod 108 by the pin 165. The pawl 141 is attached to the rod 166 by the pin 167. Upon the rod 166 (which is non-magnetic) is slidably mounted the iron core 168 which is limited in its movements relative to the rod 166 by the fixed collars 169 and 170. The lower end of the rod 166 is guided by the bracket 171. Similarly the pawl 161 is attached to the non-magnetic rod 172 by the pin 173.

Upon the rod 172 is slidably mounted the iron core 174 which is limited in its movement relative to the rod 172 by the fixed collars 175 and 176. The rod 172 is guided at its lower end by the bracket 177.

The zero speed relay device which is confined within the case 72 is provided with a cover 180. Within the case 72 is a piston 181 which moves within the cylinder 182. The cylinder 182 is closed by the threaded plug 183. The piston 181 is provided with a concentric hole 184 for a portion of its length and a port 185 opening into the hole 184. At one end of the piston 181 is mounted a stem 186. The cylinder 182 also has a port opening 187 which is in alignment with the port 185 of the piston 181. The port 187 also serves as a guide for the stem 186.

The case 72 is made in the manner shown so as to form a reservoir for oil whose level is shown by the broken line 188. A port 189 opens from the reservoir into the cylinder 182. A by-pass port 190 is provided with a regulating screw 191.

Attached to one side of the case 72 by screws 192 is an electrical insulating plate 193. Fastened to the plate 193 by the hinged members 194 is a float 195. Also attached to the plate 193 are the two studs 196 upon which the arms 197 and 198 are free to rotate. These arms are held in position by the washers 199 and the pins 200. A stop pin 201 is affixed to the plate 193.

The lower ends of the arms 197 and 198 carry rollers 202 which engage the stem 186 when the piston 181 is moved in either direction from the neutral position shown in Fig. 16. Also at the lower ends of the arms 197 and 198, but slightly above the rollers 202, are the contactor points 203 and 204 which are insulated from same by the bushings 205. Electrical connection is made from the outside terminal 73 to the contact point 203 by the flexible wire 206 and the screw 207.

Electrical connection is made with the outside terminal 71 from the contact point 204 by the flexible wire 208 and the screw 209 to the conductor strip 210 which is attached to the hinge 194. Electrical current passes from the hinge 194 to the float 195, thence to the terminal 71 by the stop bracket 211.

When the oil level is maintained (as shown at 188) contact is made through the float 195 by the stop bracket 211, but should the oil level drop sufficiently the float leaves the stop 211 and the electrical circuit is interrupted.

Both terminals 71 and 73 are insulated from the case 72 with the bushings 212 and washers 213.

Near the center of the case 72 is a stand pipe 214 standing well above the oil level 188.

At one end of the cylinder 182 is a port 215 communicating with the gear pump housing 92 through the pipe 97—A. At the same end of the case is another port 216 connecting the oil reservoir with the gear pump housing 92 through the pipe 97.

In the normal position shown, with everything at rest, the contact points 203 and 204 are brought together by the springs 217, acting through the arms 197 and 198. As the piston 181 moves in either direction, under the influence of the pressure within the cylinder 182, one arm 197 or 198 is held against the stop pin 201 by the spring 217, while the other arm is carried along by the stem 186 forcing the contact points 203 and 204 apart and breaking the electrical connection.

In order to clearly show the operation of this invention the motions of the various parts under different operating conditions will first be observed.

In Figs. 1 to 7, 8 to 11 and 15 to 19 inclusive are shown the related positions of all of the parts when the motor vehicle is at rest, with the gear shift lever 26 in the neutral position, and both brakes set to resist motion in either direction.

It will be seen that when the gear shift lever 26 is moved to the low gear position 29 shown in Fig. 1, the roller 57 is moved forward by the shifter shaft 39 to a new position 57—A (see Fig. 5). This movement of the roller 57 causes the plate 60 to move to the right Fig. 5, due to the roller traveling along the inclined face of the opening 62. This movement of the plate 60 actuates the bell crank 41 through the rod 66 causing the bell crank to take the position 41—A. Thus the shaft 127 is rotated in a counter-clockwise direction Figs. 8, 10 through the connecting rod 47 and the lever 46 causing the rod 122 to move downwardly to depress the springs 120, thereby releasing the brake bands 112 and 113. When the shaft 127 has been rotated, as described, the quadrant 140 holds it in this position by means of the pawl 141. The shaft 127 and contactor arms 75 and 77 are now in the position shown in Fig. 14.

Assuming that the engine is running, the motor vehicle is now ready to move forward when the operator engages the clutch. As soon as this is done the propeller shaft 33 begins to rotate causing the gear pump to operate through the gears 88 and 89. Immediately the pump starts, a partial vacuum is created in the cylinder 182 through the port 215 and the pipe 97—A. This causes the piston 181 to move to the right (as shown in Fig. 22). In this position the arm 198 has also been carried forward, thus separating the contact points 203 and 204 and thereby breaking the electrical circuit.

As long as the gear shift lever 26 remains in a low gear position and the clutch is left in gear the car will move forward in low gear and the forward brake bands remain in a released position, and they remain in this released position as long as the brake drum 85 is rotating in a forward direction.

If the vehicle is to be stopped, the clutch is disengaged and the gear shift lever 26 moved to the neutral position. This causes the shifter shaft 39 to move back to its mid position and the plate 60 is caused to move to the left through the rod 66, the bell crank 41, the connecting rod 47 by the spring 218 operating on the lever 46. This position of the lever 46 causes the contact arms 75 and 77 to make electrical connection through the breaker points 136 (as shown in Fig. 13) causing the forward speed coil 79 to be energized.

The vehicle will continue to move until brought to a stand-still by the service brake, or other means, and as long as the vehicle is moving thus causing the propeller shaft 33 is turning the gear pump to function. The pump operates continuously as long as the vehicle is in motion and pumps oil from the reservoir through the ports 189 and 185 and through the hole 184 in the piston 181, out of the cylinder port 215 and back to the reservoir through the port 216.

The stand pipe 214 is provided so that in case of excessive speeds if the port 189 is too small for the capacity of the pump, air will be drawn down the pipe and mixed with the oil to fill the capacity of the pump.

Next consider that the vehicle has been brought to a stand still. Immediately the vehicle stops the propeller shaft 33 stops revolving and therefore the gear pump stops functioning. The partial vacuum in cylinder 182 is broken and the piston 181 is brought back to the neutral position shown in Fig. 17 by the spring 217 acting through the arm 198 and the roller 202 upon the stem 186. In this position the contacts on the arms 75 and 77 are closed and the contactor points 203 and 204 are again brought together forming a closed electrical circuit from the storage battery 68 through the solenoid 79.

When the solenoid 79 is energized through the electrical wires 81 and 83, the core 168 is rapidly drawn up against the stop collar 169 on the rod 166. The enertia of the moving core 168 striking the collar 169 actuates the rod 166, thus releasing the pawl 141 from the quadrant 140. Immediately the shaft 127 is caused to rotate clockwise Fig. 15 by the springs 120 acting through the rod 122 and the lever arm 144.

This position of the shaft 127 causes the contactor arms 75 and 77 to break the electrical connection through the breaker points 136 and to again assume the neutral position shown in Fig. 15. The tension of the springs 120 on the brake band again locks the propeller shaft against rotation.

It can be seen that if the gear shift lever 26 is moved to an intermediate gear position 28 the roller 53 will take the position 53—A, and likewise if the gear shift lever 26 be moved to the high gear position 27 the roller 53 will take the position 53—B.

It can readily be seen that either of these movements will actuate the plate 60 in the same manner as was previously described for low gear position, except in this case the roller 53 acts on the double inclined faces of the openings 61 of the plate 60. The rest of the operations are exactly as for low gear.

The reverse gear position is shown in Fig. 7 in which the gear shift lever 26 has been placed in the position 30 and the roller 56 takes the position 56—A and causes the plate 63 to move to the left by acting on the inclined face of the opening 65. Also when the gear shift lever 26 is moved to the high gear position 27 the roller 52 takes the position 52—A, also causing the plate 63 to move to the left by the action of the roller 52 upon the inclined face of the opening 64.

The purpose of releasing the reverse brake when going into high gear is so that all of the brakes will be free from the drum 85 during driving in high gear, which constitutes a very large percentage of the driving speeds.

As the plate 63 is moved to the left the bell crank 44 is moved to the position 44—A through the connecting rod 57. Thus it will be seen that the shaft 147 is rotated in a counter-clockwise direction through the connecting rod 49 and lever 48, causing the rod 108 to move downwardly to depress the springs 107 and thereby release the brake bands 98 and 99. When the shaft has been rotated as described, the quadrant 160 holds it in this position by means of the pawl 161. The shaft 147 and the contactor arms 76 and 78 are in a position similar to that shown in Fig. 14.

The motor vehicle is now ready to move backward when the operator engages the clutch. As soon as this is done the propeller shaft 33 begins to rotate causing the gear pump to operate through the bevel gears 88 and 89, but this time in the opposite direction from that previously described for the forward speed positions.

Thus the pump operating in the reverse direction causes the oil to flow in the opposite direction through the pipes 97 and 97—A. Oil is drawn through the ports 216 and pipe 97 and discharged through the pipe 97—A and port 215 into the cylinder 182. This pressure of oil discharged against the piston 181 moves it to the position shown in Fig. 23. The surplus oil is pumped through the opening 184 and the ports 185 and 187. In this position the arm 197 has also been carried rearward thus separating the contact points 203 and 204 and thereby breaking the circuit. As long as the gear shift lever 26 remains in this position and the clutch is left in contact the vehicle will move backward in reverse gear with the reverse brake bands released from the drum.

When it is desired to stop the vehicle the clutch is released and the gear shift lever 26 is moved to the neutral position, thus the shifter shaft 38 moves back to its mid position and the plate 63 is caused to move to the right through the rod 67 and spring 219 operating on the lever 48. This position of the lever 48 causes the contactor arms 76 and 78 to close the circuit through the breaker points 156. The arms 76 and 78 are mounted on the insulating strips 157.

The vehicle continues to move rearward until brought to rest and as long as it is moving the pump is operating and holding the brakes out of engagement, as previously explained. When the vehicle is brought to a stand still and the pump stopped the same sequence of operations described for the forward speeds will cause the brakes to be set automatically against backward movement.

From the foregoing it may be seen that as long as the car is in motion in either direction the automatic brakes will not become effective, but the instant the car is stopped it will be prevented from moving in a direction opposite to the one it would move in response to an application of power from its motor when the gear shift lever 26 is set in a corresponding position.

While the braking action thus far described is entirely automatic and fool proof in every manner, it is clear that the electrical circuits normally held open when the car is in motion by a pumping action in either direction may be opened by a manually operated switch 220 in the wire 70 for the purpose of cutting out the automatic braking feature.

It will also be understood that numerous forms of zero speed mechanisms may be employed instead of the electrical device shown in the drawings. The type illustrated has been chosen merely on account of its adaptability to the work in question.

The same is true of the particular form of braking mechanism employed, as well as other elements.

The purpose of the float 195 is to insure the maintenance of the proper oil level within the reservoir contained within the zero speed device 72. It will be seen that should the oil level fall for any reason the circuit will be broken and the device will be rendered inoperative; that is, automatic braking will be dispensed with.

The purpose of the by-pass ports 190 is to take care of the excess action provided by the pump at high speeds. The same will provide a convenient relief for under or over pressures existing within the cylinder 182.

It will be understood that with the mechanism herein described the brakes are automatically set to prevent the car from moving in a direction opposite the one in which it was last driven, but not until the car has ceased moving in that direction.

I am aware that attempts have been made to hold automobiles against an undesirable movement in either direction and it is not my intention to claim such devices broadly, but I do intend to cover all such forms and modifications thereof as fall fairly within the appended claims.

I claim:

1. An automatic braking system, the combination of spring actuated brakes adapted to hold a car independently against movement in either direction, a zero speed relay mechanism actuated by a movement of the automobile in which said device is employed for the purpose of releasing the brakes in both directions when said automobile is in motion and for setting the brakes against movement in a direction opposite to the direction the car would be driven by its own motor in accord with the setting of the gear shift lever at that time.

2. An automobile including a gear shift lever and having ground-engaging wheels and means for propelling same, the combination of two spring-actuated braking mechanisms including brake bands one of which will resist the movement of the propeller in a rearward direction and the other in a forward direction, a zero speed relay consisting of means for co-ordinating the gear shift lever of the automobile for releasing the forward brake bands when the gear shift lever is set in a forward traveling position and for releasing the rearward brake when the gear shift lever is in a reverse position providing that the automobile is in movement.

3. An automatic braking device for automobiles having in combination a gear shift lever, a brake adapted to arrest the rearward motion of the automobile and a similar brake for arresting the forward motion of the automobile, each of said brakes being normally set by means of a spring when the car is at rest, means actuated by said gear shift lever for releasing the forward brake when said gear shift lever is set in a position of forward travel, means actuated by said gear shift lever for releasing the rearward brake when said gear shift lever is in a reverse position, together with a zero speed relay consisting of a governing mechanism whereby the stoppage of the automobile will re-set said brake independently of the position of said gear shift lever.

4. An automatic brake mechanism consisting of a brake drum mounted on the propeller shaft of an automobile, a spring set band brake adapted to wrap itself around said drum during a forward movement of the automobile and a corresponding brake adapted to wrap itself around said drum during a rearward movement of the automobile, a gear shift lever, means actuated by said gear shift lever for overcoming either of said brake springs for the purpose of releasing the forward brake when the gear shift lever is in a forward position or the rearward brake during the reverse position thereof, and a zero speed device adapted to trip said brake releasing mechanisms when the automobile is brought to a standstill and permit said springs to re-set said brakes on said drum.

5. An automobile, the combination of a gear set including a gear shift lever, an automatic brake set associated with said gear set, a brake to resist movement of the automobile for each direction thereof, spring means for holding said brakes in a set position when the car is at a standstill, connecting means between said gear set and the automatic braking mechanism whereby the car will be permitted to move forwardly in the direction for which said gear shift lever is set, and trip means for remove said brake mechanism from the control of said gear set and permitting the automatic setting of the brakes when the car is brought to a standstill.

MILES L. EDWARDS.